United States Patent [19]
Barnes et al.

[11] Patent Number: 6,038,488
[45] Date of Patent: Mar. 14, 2000

[54] CATHETER SIMULATION DEVICE

[75] Inventors: Scott Z. Barnes, Columbus; Douglas R. Morr, Westerville; Necip Berme, Worthington, all of Ohio

[73] Assignee: Bertec Corporation, Ohio

[21] Appl. No.: 09/006,058

[22] Filed: Jan. 12, 1998

Related U.S. Application Data

[60] Provisional application No. 60/038,922, Feb. 27, 1997.

[51] Int. Cl.[7] .............................. G06F 19/00; G06G 7/66
[52] U.S. Cl. ............................. 700/161; 700/70; 700/71; 700/72; 700/245; 600/424; 600/411; 607/122; 427/2.1; 128/920
[58] Field of Search .............................. 700/70, 71, 72, 700/160, 245; 607/122; 600/431–435, 466, 585, 424, 411; 427/2.1; 606/130; 128/95, 97, 920

[56] References Cited

U.S. PATENT DOCUMENTS

| | | | |
|---|---|---|---|
| 5,172,694 | 12/1992 | Flammang et al. | 600/374 |
| 5,433,198 | 7/1995 | Desai | 600/374 |
| 5,443,489 | 8/1995 | Ben-Hain | 607/115 |
| 5,713,946 | 2/1998 | Ben-Hain | 607/122 |
| 5,741,320 | 4/1998 | Thornton et al. | 607/122 |

*Primary Examiner*—William Grant
*Assistant Examiner*—McDieunel Marc
*Attorney, Agent, or Firm*—Francais T. Kremblas, Jr.

[57] ABSTRACT

A device for tracking the translational and rotational displacement of an object having two degrees of freedom using a single point of contact with the object. The device is particularly useful in a catheter simulation device for surgery and interventional radiology applications. A spherical contact member is mounted for free rotation about all axes in force-transmitting contact with the surface of the object and a pair of shafts are mounted in tangential engagement with the spherical member to reflect the displacement imparted to the object relative to a reference position. This arrangement provides simultaneous tracking of the combined translational and rotational displacement of the object. Measuring the displacement of the object and a haptic applicator are included such that a load may be applied to the object to precisely control the degree of force required to cause displacement of the object. The actual forces applied to displace the object are also measured such that the device is capable of providing a realistic force reflection to simulate the feel of a surgical procedure, for example. A computerized control system and conventional recording device are employed to provide a programmed procedure which provides realistic "feel" to a user of an actual surgical procedure. The device is readily adaptable for interfacing with a virtual reality type program to simultaneously provide a visual simulation of the surgical procedure.

13 Claims, 9 Drawing Sheets

CATHETER SIMULATION DEVICE

This application claims the benefits of U.S. Provisional Application No. 60/038,922 filed Feb. 27, 1997.

TECHNICAL FIELD

The present invention relates generally to systems for tracking the displacement of an object in space and particularly to a tracking system capable of measuring two degrees of freedom through a single point of contact with the object and more particularly to such a system including digitally controlled haptics and the measurement of the applied load upon the object.

DISCUSSION OF RELATED ART

Haptic interfaces often incorporate sophisticated tracking and measurement technology in order to accurately monitor the spatial position of objects being simulated or instruments used in such simulation. Any number of tracking methodologies can be employed in such devices.

Devices for simulating the human senses of touch and feel exist in the prior art. In humans these sensations are formed in the human brain utilizing input from mechano-receptors in the skin (neurons which convey information about texture and vibration), and more gross motor receptors in the muscles and tendons (golgi apparatus and others that relate strain and force to our sense of weight, inertia, size, and density of objects or movements we encounter). Whenever we interact with our environment, these signals are processed by our nervous system in order for us to make decisions about the objects we encounter and movements in the environment.

Haptic interfaces can be considered devices which simulate the actual feel of objects or movements. One of the most prevalent reasons for such devices is to enhance simulation to produce training experiences. These often involve circumstances where training or interaction with the actual system is too costly or dangerous to be performed repeatedly.

The tracking of the movement of an object in space can be accomplished by contact, non-contact or a combination of both methods. Non-contact methods have included, but are not limited to: photography (including cinematography), electro-optics, Hall-effect proximity pickups, LVDT's, variable-inductance pickups, variable-reluctance pickups, eddy-current transducers, and capacitance pickups. Contact methods have usually involved potentiometers, tachometers, or accelerometers. One common combined method of displacement measurement is an incremental optical encoder.

Photographic and cinematographic methods are limited by the lens size, resolution, and the space available for measurement. Electro-optical devices, on the other hand, combine optical and electronic principles in an effort to accurately measure motion without contacting the object measured. However, these devices usually require a light source and some are limited by the amount of the object that can be seen at any given instant in time. Also, many electro-optical devices require special marks be placed on the object in order to recognize movement. Hall-effect proximity pickups require that the object be moving towards the sensor, and are limited by the distance of the object from the sensor.

Most LVDT's are satisfactory only for measurement of static or very slowly varying displacements and give the same reading for displacements of equal amount on either side of the null position. The meter of an LVDT cannot follow or record rapid core motions. In order to achieve better results, demodulation and filtering is necessary, but continuous uni-directional measurement of translation is not possible unless the LVDT's size is such to cover the entire length of travel, and rotational displacement measurement would require another measurement instrument. Closely related, and with similar disadvantages, to the LVDT are variable-inductance and variable reluctance pickups. Eddy-current transducers, on the other hand, require that the object whose displacement is being measured be electrically conductive and move in such a way as to vary the distance between the object and the transducer. Capacitance pickups operate by measuring the change in capacitance due to rotational or translational motion, but again require the object to be conductive and depend on the gap between the object and a probe capacitor plate.

The tradeoff for resistive potentiometers is between the low resistance required for linearity and the resulting low sensitivity. Also, the resolution of most potentiometers is limited by the size of the potentiometer. A tachometer is an encoder with one output signal consisting of a pulse for each increment of displacement and are limited by errors caused by reversed motion. If motion is in one direction, tachometers have a digital counter which accumulates pulses to determine displacement from a known starting point. However, errors arise when identical pulses are produced due to motion reversal. Accelerometers measure the relative acceleration of an object with respect to a stationary reference frame, and require post-processing to obtain displacement signals.

Incremental encoders are able to rotate through as many revolutions as an application requires, by employing two or three signal-generating elements. Also, by using these multiple signals, the errors due to reversed motion are eliminated. This type of encoder can be operated as a contacting or non-contacting device for measurement, but all require contact with the object being measured.

This is most often accomplished through force-reflection. Force-reflection involves the use of actuators to move an object in response to an input and provide some kind of resistance to this input as feedback. The input can either come directly from a user or via a host computer, and then the feedback is either felt by the user or received by the host computer.

Most applications of this technology revolve around manipulator and dynamic control and joysticks. These applications include teleoperation of manipulators, or remote operation of robots, flight simulators, computer input interface devices, virtual reality interface devices, driving simulators, and surgical simulators. These applications use haptics for two primary reasons. One is to provide the feeling of the operation to the user through force reflection. The second is to provide control of movement of an object, manipulator, or mechanism.

BRIEF DISCLOSURE OF INVENTION

The present invention relates to a novel device for tracking the translational and rotational displacement of an object utilizing a single point of contact with the object having two degrees of freedom. In one preferred embodiment, a spherical contact member mounted for free rotation about all axes and in force-transmitting engagement with a single point on the surface of the object limited to two degrees of freedom is used in combination with a pair of shafts tangentially contacting said spherical member to reflect the displacement imparted to the object relative to a reference position. This arrangement not only provides tracking of either translational or rotational displacement of the object, it further provides simultaneous tracking of combined translational and rotational displacement of the object via a single point of contact.

In the preferred embodiment, a pair of optical encoders are employed in conjunction with the rotation of each shaft in contact with the spherical member to develop signals which represent the displacement of the object in both of these degrees of freedom for conversion to a measurement of the displacement of the object within these two degrees of freedom which defines the position of the object relative to a predetermined reference point.

This tracking arrangement is particularly well-suited for use in connection with a novel haptics application wherein a load can be applied to the object to precisely control the application of force to the object relating to the ease or amount of force which must be applied to accomplish displacement of the object.

As another aspect of the present invention, the forces actually applied to the object are measured whether the forces are applied via haptics application or otherwise. The preferred force transducer to measure these forces is a multi-axis strain gage device which permits one to realistically and conveniently measure both forward and reverse translation of the object.

While the present invention has a wide range of specific applications, in one preferred embodiment, the present invention can be used very beneficially for simulating surgical techniques employing catheters and endoscopes or any surgical procedure using similar elongated type instruments. A device according to the present invention provides realistic force reflection. It also can be used to record an actual surgical procedure of this nature which information can be usefully applied to improve upon training procedures.

Therefore it is one object of the present invention to provide tracking and/or measurement of the translational and rotational displacement of an elongate object or a plurality of such objects concentrically aligned within one another, each also having two degrees of freedom of movement independent of one another.

It is another object of the present invention to apply haptics on the object being tracked and measure the applied forces for user dependent requirements.

It is a further object of the present invention to provide precise measurement of forces applied to the object as described above.

It is yet another object of the present invention to accomplish the foregoing objects in an accurate and economical manner using relatively simple mechanical structures.

BRIEF DESCRIPTION OF DRAWINGS

FIGS. 6A and 6B are diagrammatic views of a preferred control diagram illustrating the interconnection between the physical components and a host computer usefully employed with the apparatus of the present invention;

DETAILED DESCRIPTION

By way of illustration of a preferred embodiment of the present invention, a device useful for surgical simulation and training is described which is constructed in accordance with the present invention. The surgical procedure involves the manipulation of an elongate, preferably cylindrical object, such as a guide wire, catheter or endoscope into the body. Often there are multiple objects concentrically contained within one another, yet each having only two degrees of freedom of movement independent from one another. These degrees of freedom are axial translation and rotation along the translatory axis of movement.

In order to simulate the feel of moving these objects during the performance of such surgeries, it is necessary to duplicate the relative ease or difficulty of displacing the cylindrical objects along the path of travel encountered during an actual surgical procedure. This requires tracking and measuring the translational and rotational displacement of the object, the application of haptic forces to stop, or resist these movements, and preferably, the measurement of the actual forces applied to the object and distributed computing processes to respond to feed back data for control.

Figure 1:
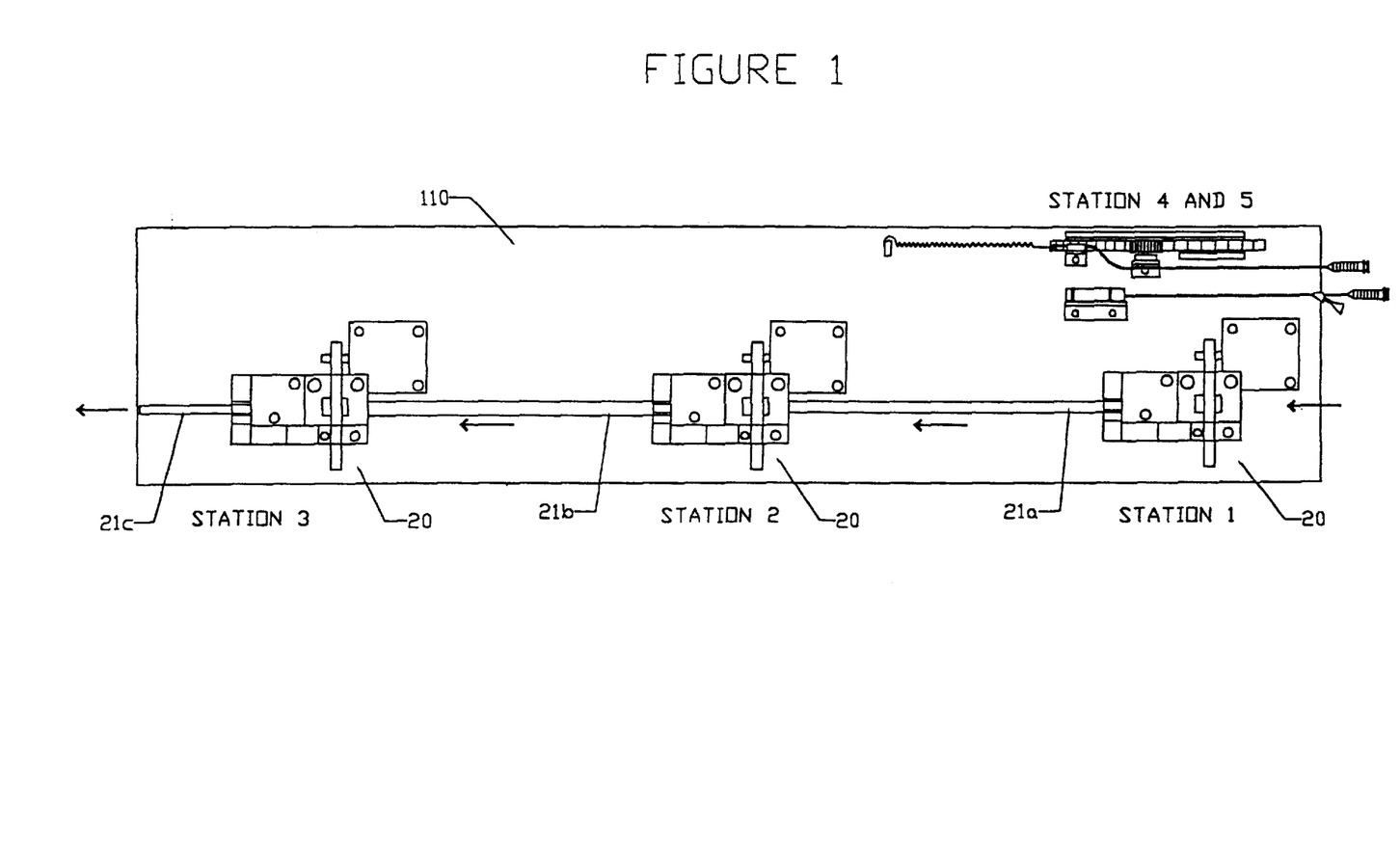
FIG. 1 is a top plan view of a multiple station haptic interface device constructed in accordance with the present invention for simulation of an angioplasty or similar procedure.

Now referring to FIG. 1, a device for use in simulating a surgical procedure involving, for example, elongate, multiple cylindrical objects concentrically aligned within one another, each independently limited to two degrees of freedom in the translational and rotational directions is illustrated in FIG. 1 and comprises multiple identical assemblies indicated generally at 20 at Stations 1, 2 and 3.

Each device represents one station for independently tracking and measuring displacement, applying the haptics and measuring the forces applied relative to one of the objects which in a simulated angioplasty procedure, for example, has a long tubular or cylindrical form.

Other procedures involving objects of a similar shape include other catheter applications, endoscopic, laproscopic or neuroscopic procedures, for example, also may be simulated using a device constructed in accordance with the present invention.

Since each device 20 is identical in construction, only one need be described in detail herein for an understanding of the present invention. When multiple concentrically arranged objects are involved, the outer cylindrical object 21*a* carrying one or more concentrically aligned objects would terminate just beyond the left end of the device 20 located at station 1. Then the next adjacent object 21*b* is extended and exposed to be tracked, measured, etc., in the device 20 located at station 2. This arrangement and disposition would be continued for each of the next adjacent concentrically disposed objects as may be required such that the displacement of each object, the haptics applied, and the force measured is independent for each object.

With reference to the drawings, in a preferred embodiment, each device 20 includes a modular construction for the tracking and displacement measurement function, the application of haptics functions, and the force measurement function for convenience service and repair.

Figure 2A:
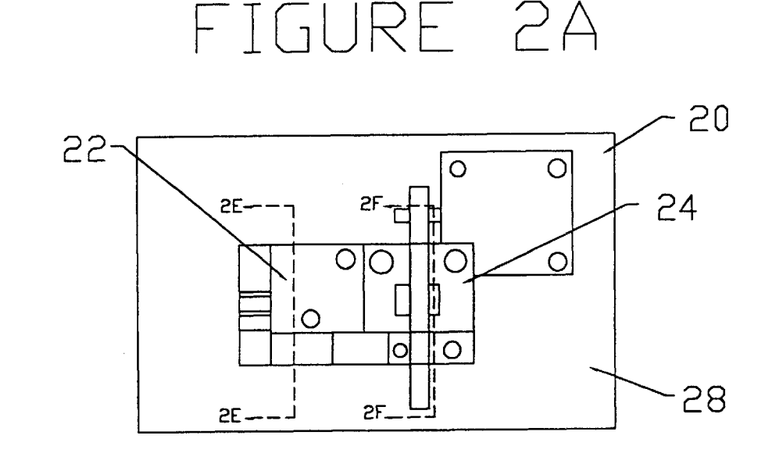
FIG. 2A is a top plan view of Station 1, illustrated in FIG. 1, showing an assembled modular design of a displacement measuring module, haptics application module, and a force measuring module constricted in accordance with the present invention.
Figure 2B:
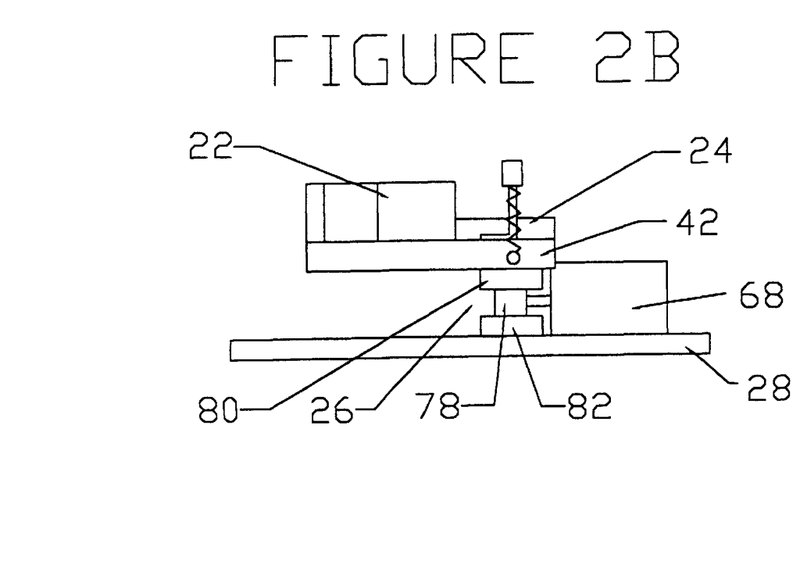
FIG. 2B is a side elevational view of the assembly shown in FIG. 2A.
Figure 2C:
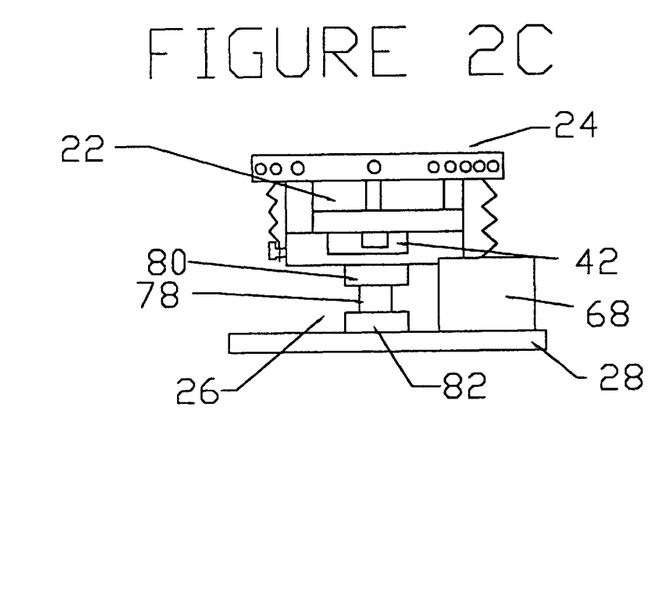
FIG. 2C is an end elevational view of the module shown in FIG. 2A.

As best seen in FIGS. 2A, 2B and 2C, a tracking and displacement measuring module, a haptics module, and a force measuring module are indicated generally at 22, 24 and 26 respectively, and each are rigidly mounted upon a base plate or support 28 which can be the same or different from the base 110 shown in FIG. 1.

Figure 2D:
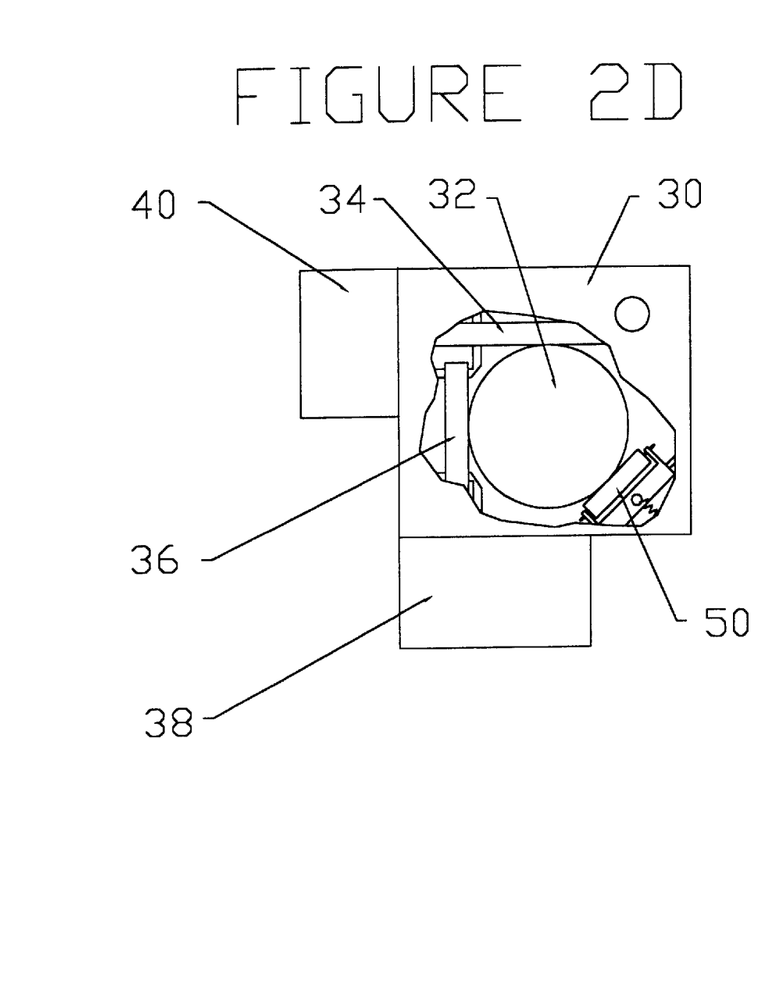
FIG. 2D is a top plan view of the displacement measuring module forming a part of the assembly shown in the preceding figures and including a cut-away of a portion of the housing to expose the interior thereof.
Figure 2E:
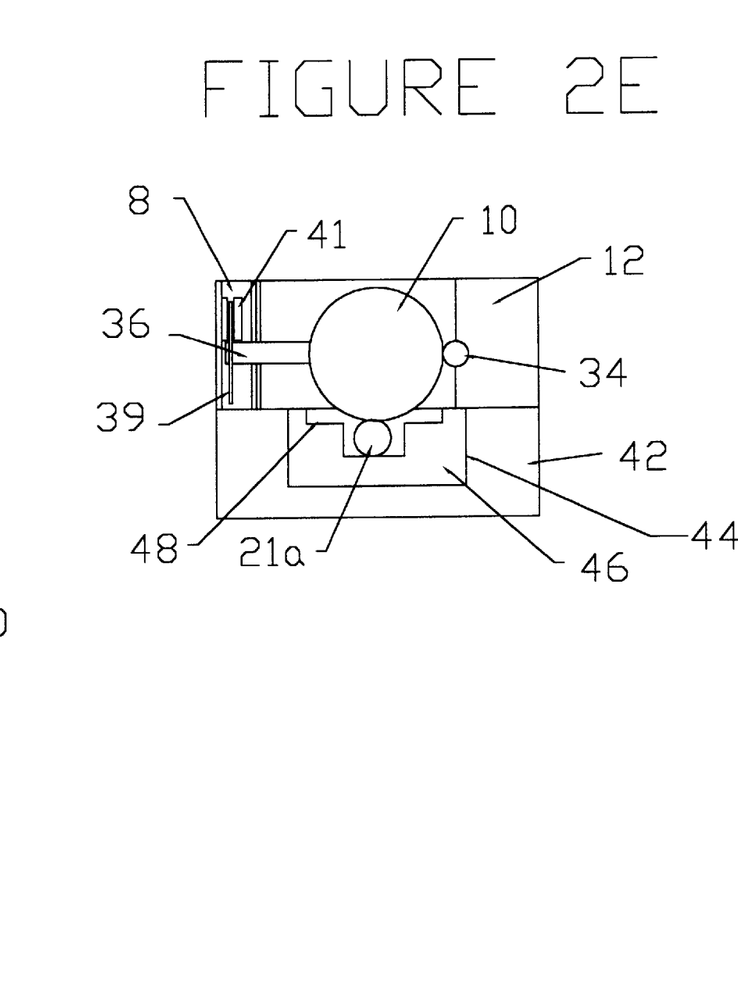
FIG. 2E is an end sectional view of the apparatus shown in FIG. 2A, the section being taken along line 2E in 2A.

As seen in FIGS. 2D and 2E, module 22 comprises a housing 30, a tracking ball or sphere 32 which rests upon the surface of object 21*a* and which is mounted for free rotation about multiple axes, a pair of rotatably mounted shafts 34 and 36 in tangential contact with the surface of ball 32 and conventional optical encoder assemblies 38 and 40, each of which include a conventional encoder wheel 39 and optical encoder 41.

As the object 21*a* is displaced along its translational axis, tracking ball 32 rotates proportionally. When the object 21*a* rotates, ball 32 and shaft 34 rotate proportionally. When object 21*a* is simultaneously displaced translationally and rotationally, both shafts 34 and 36 are rotated by the rotation of the tracking ball 32 proportional to the rotation and translation of object 21*a*.

The proportional relationship between the diameters of these components and the length of translational displacement of object 21*a* can be adjusted to provide a lesser or greater number of counts per revolution of the optical encoder to adjust the degree of resolution of the displacement measurement.

The housing 30 and the supporting structures for optical encoder assemblies 38 and 40 may be rigidly attached to a guide plate 42 which in turn is rigidly attached to base 28 via attachment to force module 26 in any suitable conventional form, such as threaded fasteners, not shown.

In the preferred embodiment described, shafts 34 and 36 are made from low friction material relative to housing 8 to reduce frictional drag and to permit a more simple mounting structure to retain them in a freely rotatable condition and thereby eliminate the need for more expensive bearing structures. One form of acceptable mounting may include a groove in the adjacent inner wall surfaces of housing 30 along the axis of a respective shaft which rotatably supports each shaft 34 and 36.

Another form is simply a suitable low friction bearing surface provided in the wall of housing 30 through which each shaft is axially extended wherein the outer end is suitably rotationally supported by the encoder supporting structure. Other conventional means for suitably detecting and measuring the rotation of spherical member 32 may be employed instead of the optical encoders to obtain essentially equivalent results and may be either the contacting or non-contacting type as would be recognized by those skilled in the art.

Guide plate 42 preferably includes a rectangular shaped recess 44 adapted to accept a guide plate insert 46 which includes an arcuate clearance recess 48 providing a relief space allowing appropriate free contact between ball 32 and object 21*a*.

As best seen in FIG. 2D, a spring biased tertiary contact roller 50 is operably mounted within housing 30 to retain ball 32 in contact with shafts 34 and 36 and yet permit free rotation of ball 32 about all axes.

Now referring to FIGS. 2F, 3A, 3B and 3C, the haptics module 24 which is also mounted on guide plate 42 adjacent to displacement measuring module 22 is shown in greater detail.

A haptics housing 52 is fixedly mounted to guide plate 42 in any conventional manner, preferably by threaded fasteners, and is connected to vertically upstanding bar 54 which functions as a fulcrum support for a torque bar 56 pivotally connected thereto at 57. A haptics applicator 58 is pivotally connected about pin 60 at a point intermediate the opposing ends of torque bar 56 and extends downwardly through aligned openings in haptics housing 52 and into relief space 48 where shaped end 59 engages object 21*a*.

Figure 2F:
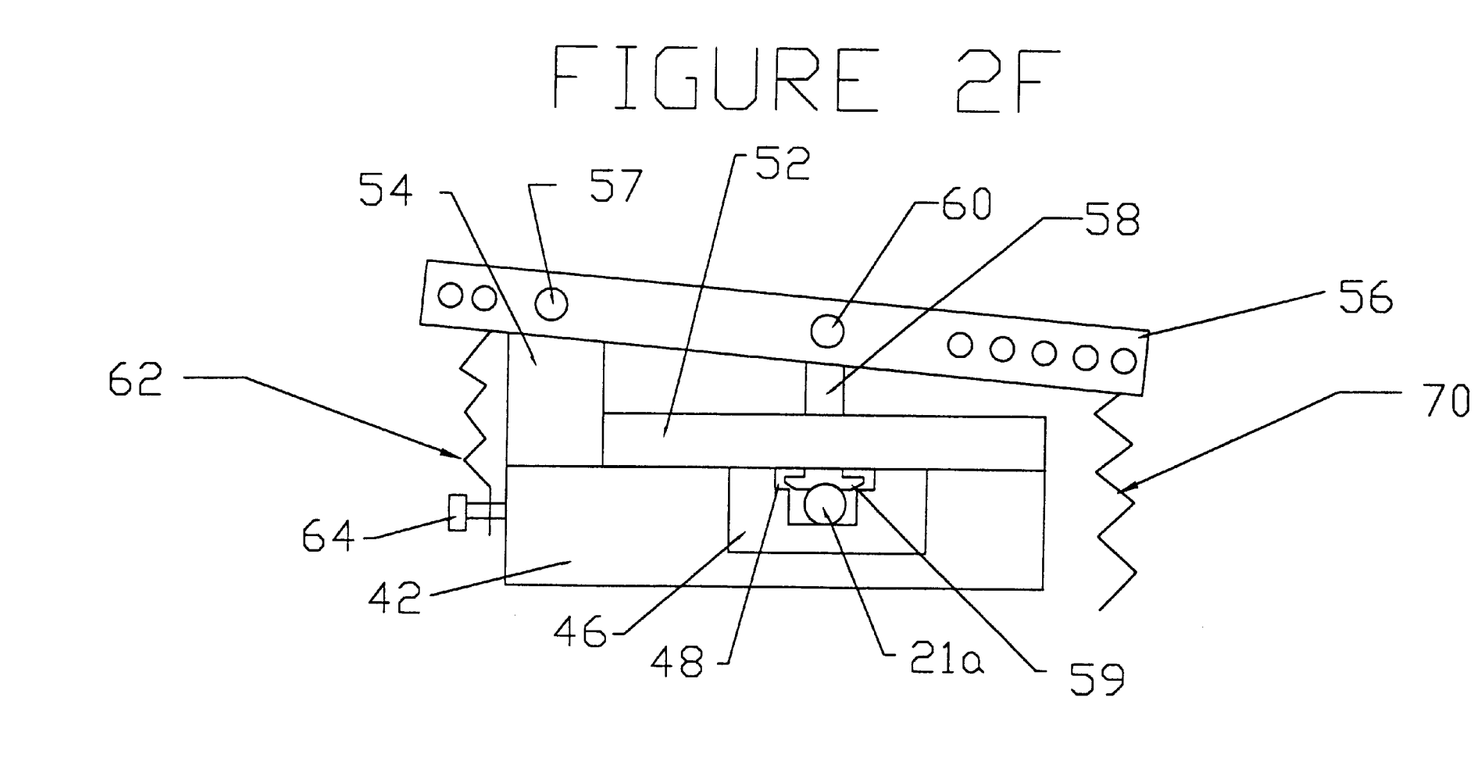
FIG. 2F is an end sectional view of the apparatus shown in FIG. 2A, the section being taken along line 2F in FIG. 2A.
Figure 3A:
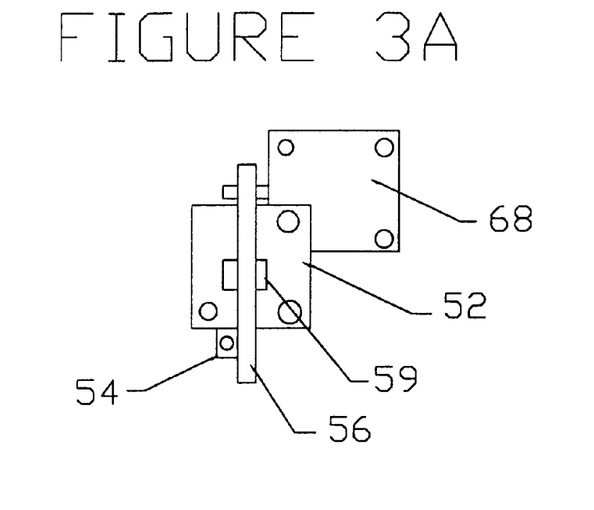
FIG. 3A is a top plan view of the haptics application module forming a part of the assembly of the apparatus shown in FIG. 2A, and shown in isolation from the remaining assembly.
Figure 3B:
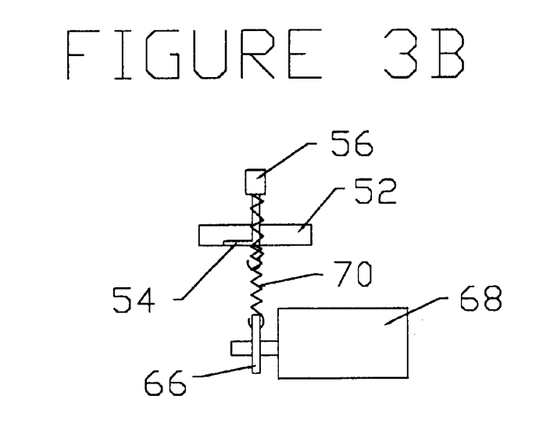
FIG. 3B is a side elevational view of the module shown in FIG. 3A.
Figure 3C:
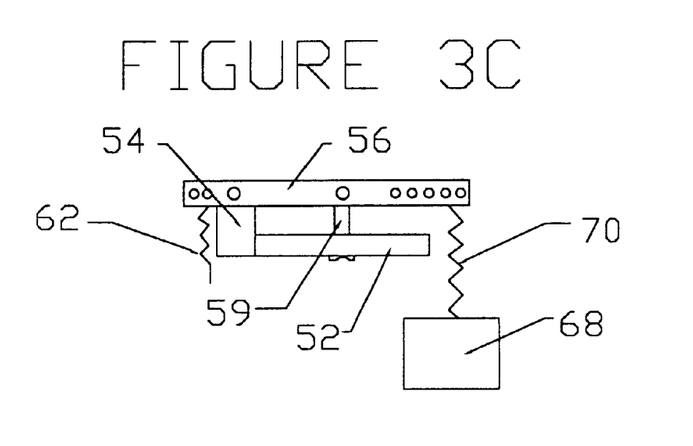
FIG. 3C is an end elevational view of the module shown in FIG. 3A.

On the left end of torque bar 56, as seen in FIG. 2F, a counter relief spring 62 is connected between bar 56 and a spring support element 64 which is mounted to guide plate 42. This provides an elastic counter force transference element to an opposing spring 70 connected to the opposite end of bar 56.

The opposing end of bar 56 is operably connected to an actuator, in the form of a flywheel 66 driven by an electric motor 68, by a spring element 70

In a preferred embodiment, motor 68 is operated in a torque mode designed to respond to an actuation signal from a host computer, for example, programmed with a predetermined torque displacement curve. Preferably, flywheel 66 is in the form of a bar having holes or slots spaced along its length for optionally connecting linear spring 70 to the bar along spaced intervals to vary the degree of mechanical advantage applied.

By pivotally connecting haptics applicator 58 for one degree of freedom at spaced intervals along the length of torque bar 56, one can conveniently vary the mechanical advantage and hence the vertical component of force applied to applicator 58 by motor 68 actuated in one direction to cause rotation of the motor shaft, and the connected flywheel 66 to cause a change in tension on spring 70, which in turn rotates torque bar 56 about fulcrum 54 to cause applicator 58 to move vertically to engage object 21a. This represents coupled haptics in that the engagement of the end 59 of applicator 58 against object 21a restrains both transition and rotation of object 21a. Of course, actuation of motor 68 in the opposite direction causes applicator 58 to move vertically away from object 21a. Preferably, motor 68 is actuated digitally. Depending upon the torque-displacement curve program, the haptics can be applied to allow different degrees of constrained translation and rotation of object 21a. Other embodiments can also be implemented to de-couple the haptics according to the particular application desired.

Figure 4A:
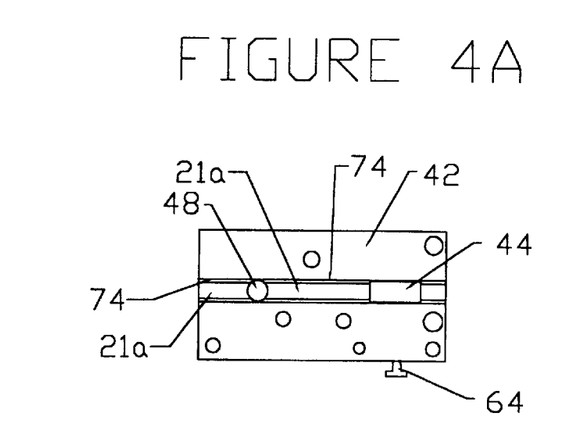
FIG. 4A is a top view of the guide plate forming a part of the assembly shown in FIG. 2A and shown in isolation from the remaining assembly.
Figure 4B:
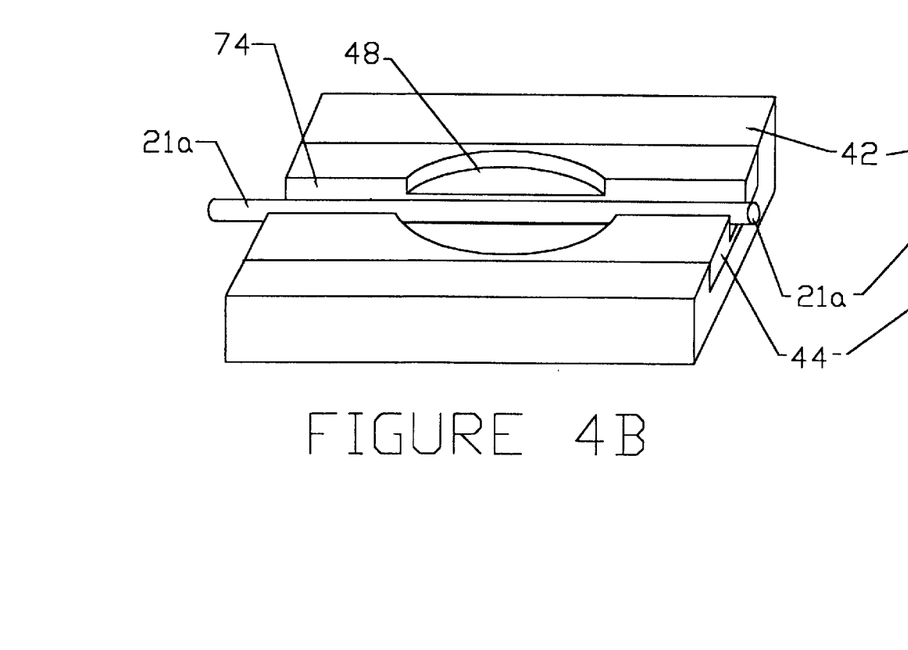
FIG. 4B is a partial perspective view of the guide plate shown in FIG. 4A illustrating that portion communicating with the tracking and measuring module.
Figure 4C:
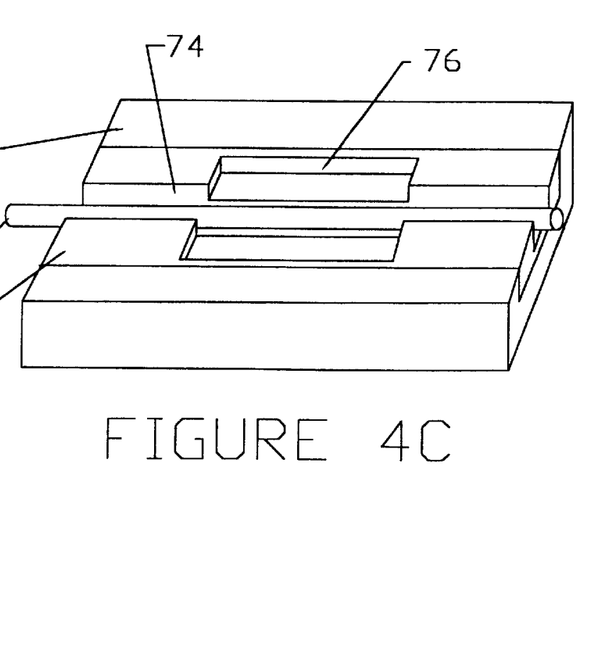
FIG. 4C is a partial perspective view of the guide plate shown in FIG. 4A illustrating that portion communicating with the haptics application module.

Now referring to FIGS. 4A, 4B and 4C, the guide plate 42 and guide plate insert 44 are shown apart from the assembled structure.

As seen in these figures, guide plate 42 is provided with a recess adapted to accept guide plate insert 44. Guide plate insert 44 includes an elongate guide slot 74 for accepting object 21a. Slot or elongate recess 74 is interrupted by an arcuately shaped recess 48 to provide clearance relief for contact between tracking ball 32 and object 21a. Further, a second enlarged recess 76 is provided downstream and aligned with the haptics applicator 58 to provide clearance relief for contact between the end 59 of applicator 58 and the portion of object 21a extended through the length of recess 74. The portion of guide plate 42 associated with the tracking and measurement module 22 is shown separated from the portion associated with haptics module 24 in FIGS. 4B and 4C for a better perspective view.

With reference to FIGS. 2B and 2C, force measurement module 26 consists of a force transducer 78, preferably in the form of a multi axis strain gaged device 78 operably mounted to guide plate 42 via a load transference plate 80 and rigidly fixed to base plate 28 via mounting plate 82. In order to accurately measure the actual forces applied to object 21a, force transducer 78 is mounted beneath guide plate 42 in vertical alignment with haptics applicator 58 and preferably is capable of measuring the vertical and shear forces applied to object 21a by the preferred configuration of the strain gauge.

The strain gages are conventionally connected in a Wheatstone bridge configuration and are is operatively connected to a power source to apply a voltage across each strain gage bridge element in the transducer. The output voltages of the strain gage bridges are then a measure of the change in voltage due to the strain induced upon the object by an applied load or otherwise. These voltages are preferably transmitted through an amplifier. The output is then available to be directed to an analog to digital converter, in a conventional fashion, and then communicated to a computer connected to or internal to a host control computer in order to collect the data generated. This force data can then be compared to obtain the vertical force-displacement, shear force-displacement, vertical force-torque, and shear force torque curves in a preferred embodiment. Other calculations and comparisons can also be made depending upon the users requirements.

In a preferred embodiment for surgical simulation applications, the multi-axis strain gage transducer provides measurements of the 3-orthogonal forces and 3-orthogonal moments applied to the object 21a and such a strain gaged device is available from Bertec Corporation located in Columbus, Ohio.

All of the devices employed may be accessed through a serial communications protocol and data passed through "smart" servo actuators and an integrated controller.

Figure 6A:
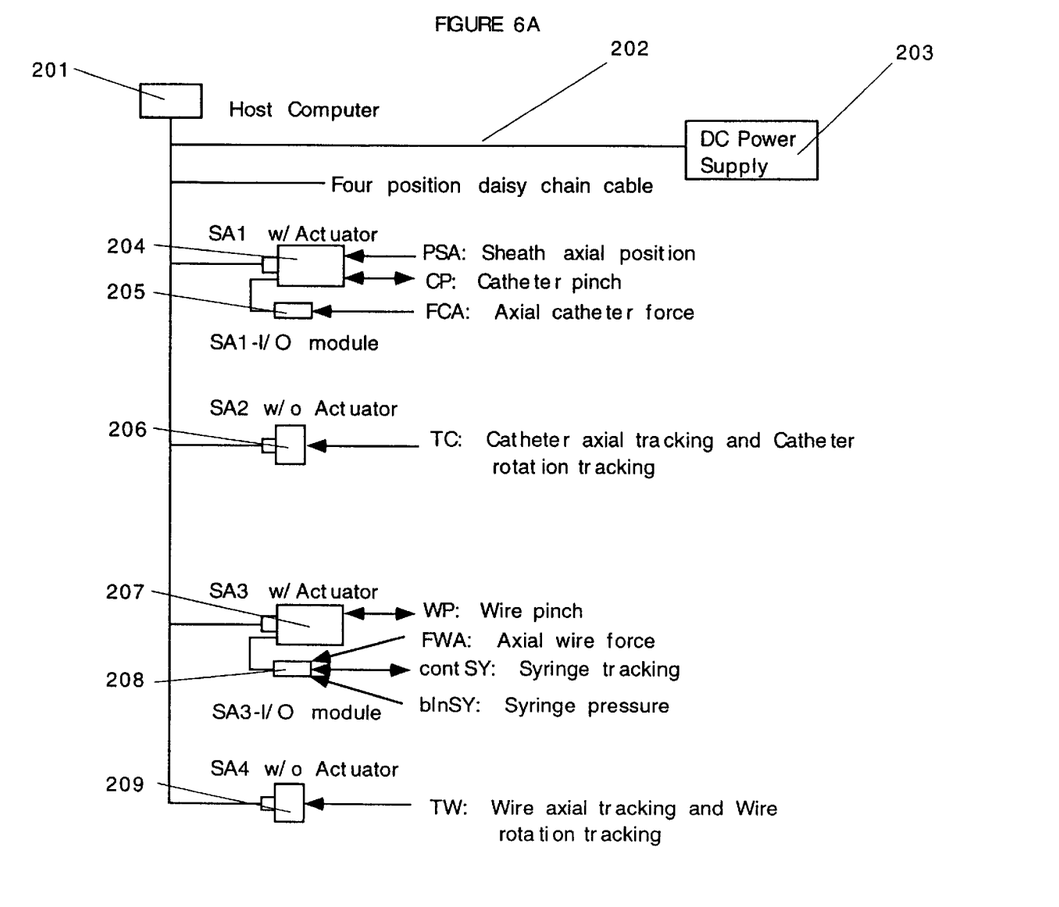
FIG. 6A is a schematic diagram illustrating logical diagram of the control and communication portion of the device.
Figure 6B:
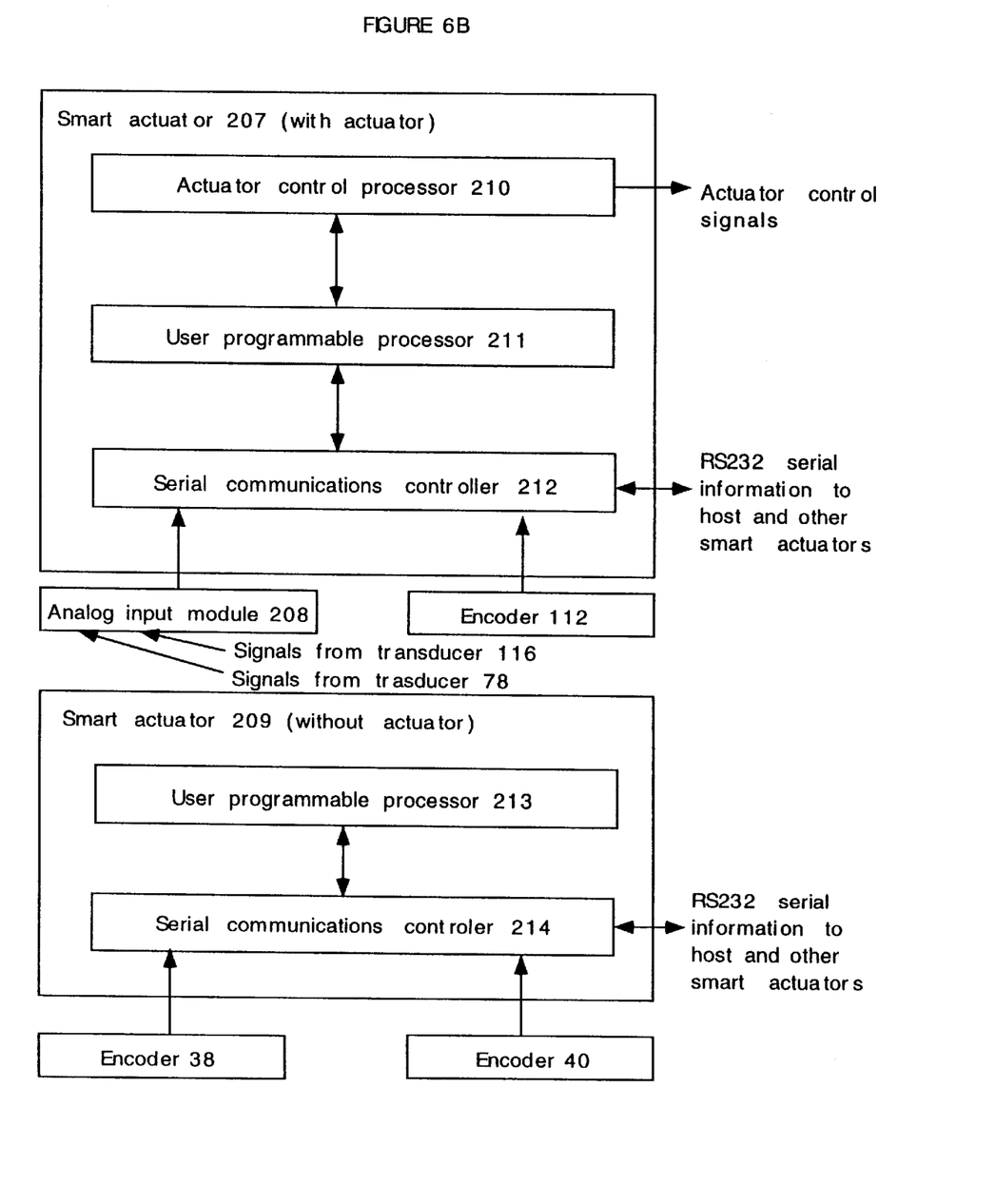
FIG. 6B is a detailed schematic view of the control diagram for one haptic station.

A flow diagram of a system organization is shown in FIG. 6 as one preferred system to provide a haptic interface device controlled by a host computer.

In the present invention separate processors (digital computers) independent of the host computer provide the means for a very high bandwidth regarding communications and control of the haptic and tracking functions of the device are highly preferred. These processors reduce the functional burden of the host computer which is performing the main control function of the simulation. In typical medical or surgical simulations similar to this preferred embodiment, the host computer is often a high end graphics workstation such as a SGI onyx, Silicon Graphics Corporation, Santa Clara, Calif. By incorporating computing power in the haptic device itself, distributed processing can be employed to reduce the computational burden of the hose and ultimately allow such simulations to be performed on much less expensive host computers and even Personal Computers (PC's). The type of processors used here are 8, 16 and 32 bit microprocessors operating independently depending upon their specific function. All of these processors have been miniaturized with surface mount technology (SMT) and are packaged in close proximity to the actuators themselves (DC servo motors in this case). There is a processor dedicated to the actuator control, one for the communications handling, and one to process downloadable user programs from the host. These user programs can be used to extend the functionality of the "smart actuator". For example, closed loop feedback control of one haptic degree of freedom can be programmed and controlled from this local processor thus removing any of this computational burden from the host and reducing the bandwidth of information that needs to be passed to the host within the primary simulation loop.

Further, a higher range of cycles, for example 1500 to 4000 Hertz, is preferred to more closely simulate the actual human response to touch and feel sensations as compared to 20 to 30 Hertz for visual simulation moving pictures.

In this embodiment all communication is carried on a serial port daisy chain configuration from the host to each respective smart actuator. This allows for a multitude of host computer types as well as a very modular expandable architecture on which to build. The overall flow of information and connectivity is shown in FIG. 6a. A more detailed description of the information flow is in FIG. 6b and described below.

Commercially available programmable actuators and integrated control modules, such as available from Animatics Corporation of Santa Clara, Calif., each equipped with analog and digital I/O interface modules work well for purposes of the present invention. However, other suitable actuators and conventional computer control programs can be used depending upon the requirements of a given application.

In applications which include multiple cylindrical objects inserted within one another, each next adjacent concentric object would be extended beyond the first station and into the next adjacent station, such as stations 2 and 3, for example, which are identical to station 1 as described herein.

In view of the above description, one of ordinary skill should understand that a surgical simulation apparatus constructed in accordance with the present invention can be used to simulate the tactile sensation or feel of intervential radiology procedures, such as angioplasty for example, wherein the user may insert actual sheaths, guide wires, catheters and other similar instruments into the device and experience the "feel" of an actual surgical procedure in a training method.

The apparatus constructed for such uses would be intended to be combined with and integrated with a visual simulation using virtual reality technology so that the physician may train using a programmed visual picture coupled with simulated tactile feedback using the present invention to provide a highly realistic and beneficial training program in order to reduce the occurrence of inadvertent and accidental mishaps which occur most often in the performance of the first few procedures of this type by a physician.

The apparatus of the present invention allows the user to use and insert into the guide slot or recess 74 the actual devices used in the procedure, such as guide wires and catheters or other similar instruments actually used in surgical procedure. The guide slot 74 provided in removably mounted guide plate inserts 44 may be adapted to the size of the object 21a and any smaller concentrically aligned and slideably mounted cylindrical objects within the outer object 21a, such as a guide wire or other instrument.

Further, by merely changing the removable guide plate inserts and the haptics applicator, a variety of diameters of objects can be conveniently used in the apparatus without changing other components.

As an example of one preferred use of the present invention, in a typical angioplasty procedure, an incision is made in the groin or upper thigh area. The femoral artery is accessed and entered via an internal incision. A relatively large diameter sheath is then placed through the incisions and into the lumen of the femoral artery. The length of the sheath inserted into the artery may vary from about 3 to 15 mm and the sheath diameter may vary from about 3 to 12 mm. Next, the guide wire or the catheter can be inserted into the sheath and navigated up the vascular tree to the site of interest. The physician navigates the instrument by utilizing their sense of touch and by periodic fluoroscopic visual images. The fluoroscope reveals a projected real-time image of the wire, catheter, and sheath assembly within the blood vessels via the injection of a radio-opaque dye into the bloodstream through the sheath or catheter and into the network of the blood vessels referred to as the vascular tree.

The catheter or wire or a combination thereof is then advanced through the sheath to the site of interest to provide tools or perform a given function as necessary. For example, a catheter with an inflatable balloon on its distal end may be advanced to the site of a narrowing of the vessel and inflated. Alternatively other tools may be advanced to a certain site on the end of a wire or catheter, such as stents or blood clot filters. In such a procedure or in similar procedures, one can readily appreciate the need to develop or train a sense of touch related to the necessary manipulation of the elongated objects along the desired vascular path. An apparatus constructed in accordance with the present invention provides a means to simulate this manipulation and impart such training without the risk of injuring a patient by using to much force or an improper manipulation of the tool in the effort to make the desired advance of the tool.

Figure 5A:
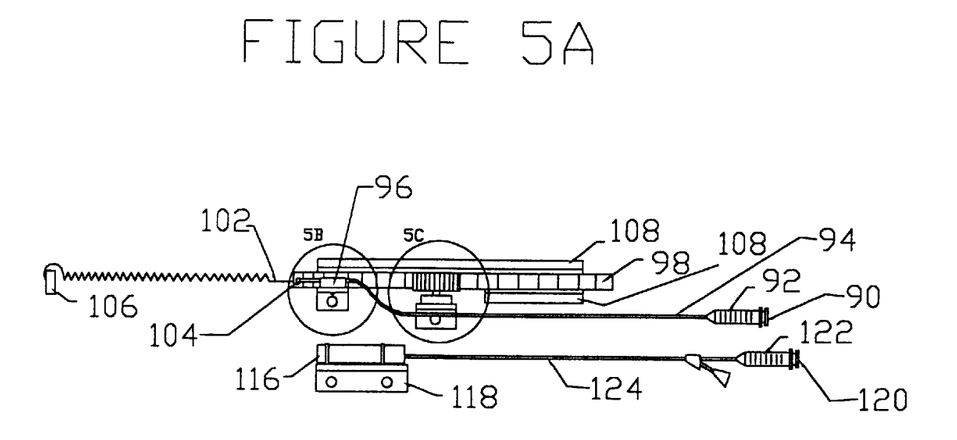
FIG. 5A is a top plan view of Station 4 shown in FIG. 1 representing a simulation for delivering a volume of fluid from a simulator syringe forming Station 5 as seen in FIG. 1 illustrating a part of a preferred embodiment of the present invention.
Figure 5B:
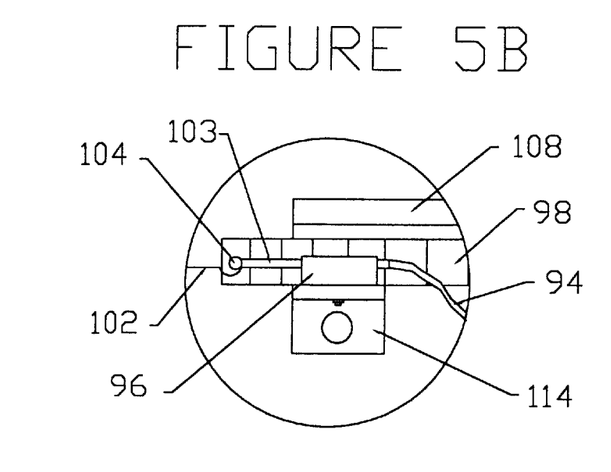
FIG. 5B is an enlarged partial plan view of a portion of the apparatus shown in FIG. 5A illustrating details of the fluid delivery device shown in FIG. 5A.
Figure 5C:
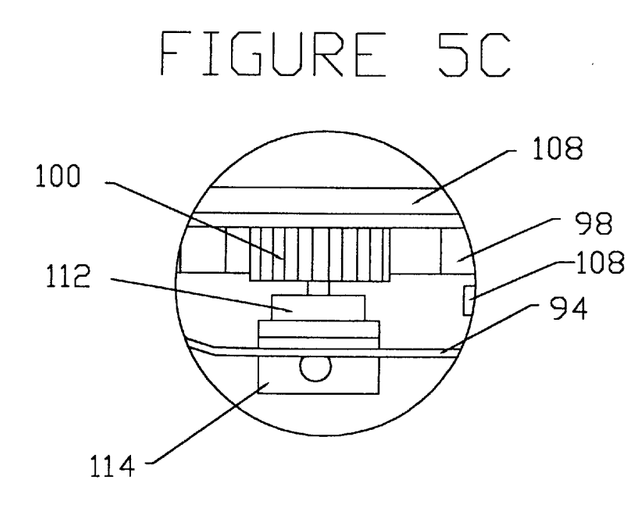
FIG. 5C is an enlarged partial plan view of the apparatus shown in FIG. 5A illustrating further details of the structure shown therein.

Now referring to FIGS. 5A, 5B and 5C, the measurement of the volume of a syringe applied to deliver a liquid and the pressure applied to inflate a balloon can be advantageously incorporated into the apparatus of the present invention to provide a more realistic simulation of like procedures used in an angioplasty procedure as represented by stations 4 and 5 also shown in FIG. 1.

Station 4 includes apparatus for measuring the simulated volume of a syringe for injecting a fluid into the vascular path used in an actual procedure. This is accomplished via a linear relationship between the volume displaced by the translation of a movable plunger 90 in syringe vessel 92. A wire 94 is connected to one end of plunger 90. Wire 94 is sufficiently rigid to apply force in compression without kinking, yet flexible enough to be able to bend within the device without elastic deformation. The distal end of wire 90 is fixed to a housing 96 connected to a rack 98 operably engaging a pinion 100. A spring 102 is connected between a pin 104 fixed to the outer end of wire 94 via a rigid connector 103 and a stationary support 106 and functions to assist in the translation of wire 94. A pair of rack support plates 108 are connected to rack 98 and may be mounted to a table or base 110, such as seen in FIG. 1, which supports the other stations 1, 2 and 3 as may be desired.

The shaft of a conventional optical encoder 112 is operably mounted to pinion 100 and the encoder is mounted to a support block 114 which is fixed to table or base 110. The translation of plunger 90 causes proportional translation of wire 94 and rack 98, which in turn cause rotation of pinion 100 and the shaft of encoder 112. The output of encoder 112 in counts is communicated to an analog to digital converter and then to a host computer wherein a suitable software program may determine the simulated volume displaced from the syringe 92.

Station 5 comprises a module for measuring the pressure applied to simulate inflation of a balloon such as used on the end of a catheter. A strain gaged pipe or tube device 116 is fixed to a support 118, which in turn is mounted to base 110. Gauge 116 measures the circumferential and longitudinal stresses within the pipe which are proportional to the pressure generated by translational manipulation of a plunger 120 movably mounted in a tubular housing or syringe 122 and communicated to gauge 116 via a tube or conduit 124. The output of strain gaged device 116 is communicated to a conventional amplifier and then to a host computer to monitor a simulated balloon inflation rate and pressure via an appropriate software program.

Stations 4 and 5 can be used in conjunction with Stations 1–3 as may be necessary to more realistically simulate procedures employing such instruments in a given procedure.

It should be pointed out that appropriate force-displacement curves to actuate the haptics application which closely mimic the actual tactile sensations experienced by a physician performing the given procedure are very important for practical applications. However, the concepts taught herein can also be employed during performance of actual surgical procedures to develop more accurate and realistic force-deflection curves for use in subsequent simulation of the procedure for teaching and training purposes.

It should also be noted that the force measuring function of module 26 in the preferred embodiment of the present invention is important not only to accurately measure the applied force on the object, but further the force transducer should preferably measure the axial tension and compression forces applied to the object to function as a sensor for feedback control to simulate particular manipulations of the object in either direction. This is significant when the applied haptics are in a "pinch" mode such as described herein.

Now referring to FIGS. 6A and 6B, all communication is carried on a serial port daisy chain configuration from the host to each receptive smart actuator. This allows for a multitude of host computer types as well as a very modular expandable architecture on which to build. FIGS. 6A and 6B represent the systematic and logical representations of the simulator including the individual module communications flow.

Herein the term "smart actuator" refers to the combination of an actuator (such as a DC-brushless servo motor) and an integral actuator control, serial communications, and user programmable processor. In the present device these three processors and the actuator itself are all integrated into one very compact package and enclosure. This package is an approximate cylinder 2 inches in diameter and 5 inches long. It is this combined computer and actuator that is referred to as the term smart actuator. These processors can also be used independently or without the actuator attached (reduces length to 1.5 inches).

These smart actuators are connected to the host computer and to their stand alone power supply by a daisy chained serial cable and an overall system schematic as shown in FIG. 6A. Each smart actuator module has the capability to: interface to the host and the other actuators present by connecting to the daisy chain cable; handle independent digital and analog I/O through an I/O bus; up to 256 channels of analog I/O and 256 channels of digital I/O can be interfaced to each individual smart actuator on the daisy chain; can monitor two independent optical encoder signals and can handle two limit switches.

FIG. 6A shows the logical diagram of the control and communication portion of the device. The host computer 201 is connected to the smart actuators 204, 206, 207, 209 (two with actuators, two without) via a 4 station daisy chain cable 202. The same cable 202 also connects the smart actuators to their common DC power supply 203. Power supply 203 provides the required voltage and current to drive all of the processors and actuators contained in 204, 206, 207 and 209. Physically, when relating these smart actuators (204, 206, 207 and 209) to FIG. 2 and FIG. 3, which is the detailed view of any one station mounted in base 110 as depicted in FIG. 1, these smart actuators are represented by motor 68 (smart actuator) in FIGS. 2A and 3A. In the case of 204 and 207 an actuator is present, in the case of 206 and 209, the actuator is not needed thus, not included.

Smart actuator 204 is mounted at station 2 and provides the haptic actuation for the catheter. The auxiliary encoder channel is attached to an encoder at station 1 and is used to measure axial translation of the sheath. Analog I/O module 205, attached to smart actuator 204, is used to convert the analog output of load cell 78 into digital signals for the processors in 204 in use in the overall simulation and to be passed to the host 201 via the communications network provided by serial daisy chain cable 202. The output of load cell 78 of station 2 relates to the haptic forces applied to the catheter. Smart actuator 206, which is used without an actuator, is also mounted on base 110 near station 2. Since there is no mechanical connection between station 2 and smart actuator 206 it could be mounted anywhere on base 110. It is interfaced to station 2 via signal cables only (see FIG. 6B). The primary and secondary encoder channels of 206 are used to monitor the axial and rotary position of the catheter via signal cables that connect to encoders 38 and 40 respectively. Smart actuator 209 (without actuation) is employed in an identical manner to station 3 in order to measure the axial and rotary motion of the wire. This leaves smart actuator 207 to actuate the haptics module at station 3 which is used to apply forces to the wire. Analog input module 208 is connected to smart actuator 207 and converts the analog signals from the wire load cell 78 at station 3 to digital signals for use in the simulation. Additionally, an analog signal from pressure sensor 116 is digitized here and passed to host 201 via smart actuator 207 and cable 202. The auxiliary encoder channel of smart actuator 207 is used to monitor tracking encoder 112 which monitors the position of contrast syringe 92 relative to its plunger 90.

FIG. 6B is a detailed view of the control diagram for one haptic station. In this case, station 3, the wire haptic and tracking module, is detailed.

Smart actuator 209 (without actuator) is used to monitor and process the encoder output of encoders 38 and 40. This information is passed through serial communication processor 214 to user programmable processor 213 where the encoder pulses are processed and the axial and rotary position of the wire are calculated. These calculated values are then passed back to serial communications processor 214 and then sent out to be used by hose 201 and the other smart actuators on the chain via RS232 daisy chain cable 202. The tracking information is used by the host and the other smart actuator processors to control what haptic forces should be applied to the wire via smart actuator 207 and 210. These calculations can be done at the hose or at one of the smart actuator user programmable processors (213 or 211). The result is then sent to processor 210 in unit 207 and sent to the actuator. The results of this force application are also continually monitored by transducer 78. Once they have been digitized by analog input module 208, they are passed to processor 211 and are used in real-time to control the haptic forces applied by processor 210 and the actuator. This closes the loop of feedback control and offers substantial advantages over any other approach to haptic force application to date. The analog signals from balloon pressure transducer 116 are also digitized by 208 and passed through processor 212 to host 201 via cable 202. Likewise, encoder 112 output is processed and sent to host 201.

In the preferred embodiment it is also very advantageous to be able to measure and sense the direction and magnitude of rotational forces applied to the object, i.e., torque. Therefore force transducers which are capable of doing all of the functions referred to above are more preferred, such as a suitable strain gage arrangement equivalent to the one described herein however, other less preferred forms of force transducers capable of performing these functions may be used in the present invention. However, presently, the expense of alternate force transducing arrangements capable of performing these functions is greater than a strain gage or load cell configuration.

In summary, the apparatus of the present invention provides a novel means for tracking the translation and rotation of an elongate object via single point contact on the object and control of the force necessary to manipulate the object within these two degrees of freedom to provide a simulated "feel" to the operator. The actual forces applied are accurately measured and can be utilized in a feed-back loop to provide control of the haptics applied as well as provide data useful to modify the programming of a force-displacement curve to use in subsequent training procedures.

We claim:

1. In a device for tracking the translational and rotational displacement of an object comprising, in combination;

a) a base;

b) a housing mounted on said base;

c) a passage provided in said base adjacent to said housing and conformed to movably receive an elongate object disposed within said passage and limited to displacement longitudinally along the length of said passage and rotationally about the axis of said longitudinal displacement;

d) a spherical member contained within said housing for rotation about all axes, a portion of an outer surface of said member extended through an opening in said housing into said passage for force-transmitting tangential contact with the surface of an elongate object disposed within said passage;

e) a first shaft rotatably mounted within said housing in force-transmitting tangential engagement with said spherical member;

f) a second shaft rotatably mounted within said housing in force-transmitting tangential engagement with said spherical member and disposed at generally a right angle relative to said first shaft;

g) the rotation of said first and second shafts being proportionally responsive to the rotational displacement of said spherical member induced by translational and rotational displacement of the elongate object movably disposed in said passage to generate signals representing a measure of the translational and rotational displacement of said object in said passage relative to a predetermined reference position.

2. The device defined in claim 1 wherein said elongate object disposed in said passage has a cylindrical configuration.

3. The device defined in claim 1 further comprising a haptics applicator mounted on said base means and including a contact member moveable into force-transmitting engagement with an object disposed within said passage at a location spaced from the location of said point of contact between said object and said spherical member to resist the translational and rotational displacement of said object within said passage, an actuator operatively connected to said contact member to move said contact member into and out of engagement with said object.

4. The device defined in claim 3 wherein said force transducer measures both axial tension and compressive forces applied to said object.

5. The device defined in claim 4 wherein said force transducer measures the torque applied to said object in opposite directions about the axis of translational movement.

6. The device defined in claim 3 wherein said force transducer is a multiple axis strain gauge configured to measure 3 orthogonal forces and 3 orthogonal moments applied to said object.

7. The device defined in claim 6 wherein the data from said force transducer is employed in a feed-back loop to control the intermittent application of force to said object to simulate forward and reverse manipulation of said object in one or both the longitudinal and rotational directions.

8. The device defined in claim 3 further comprising a force transducer mounted on said base in force-transmitting relationship to an object disposed within said passage to sense and generate a signal representative of the actual forces applied to said object.

9. The device defined in claim 8 wherein said force transducer is a multi-axis strain gage.

10. The device defined in claim 1 further including a second housing mounted on said base in spaced relationship to said first mentioned housing and adjacent to said passage, a second spherical member contained within said second housing for rotation about all axes, a portion of an outer surface of said second spherical member extended through an opening in said housing and into said passage for force-transmitting engagement with the surface of an elongate object disposed within said passage downstream from said first mentioned housing; a third and fourth shaft rotatably mounted within said second housing in force-transmitting engagement with said second spherical member and disposed at generally a right angle to one another to rotate proportionally to rotation of said second spherical member caused by the longitudinal or rotational movement of an elongate object disposed within said passage and having a surface in tangential contact with said second spherical member.

11. The device defined in claim 10 including a first elongate hollow object disposed within said passage with an outer surface in contact with said first mentioned spherical member in said first mentioned housing and a second elongate object independently movably disposed within said first elongate object, said second object confined to longitudinal and rotational displacement within said first elongate object and including a length portion extending within said passage beyond a terminal end of said first elongate object and in force-transmitting engagement with said second spherical member in said second housing.

12. The device defined in claim 11 further comprising a second haptics applicator mounted to said base means and including a contact member movable into variable force-transmitting engagement with said second elongate object at a location spaced from the location of the point of contact between said second object and said second spherical member to resist the translational and rotational displacement of said second object within said first object and said passage.

13. The device defined in claim 10 further comprising a second haptics applicator mounted to said base means and including a contact member movable into variable force-transmitting engagement with an object in said passage at a location spaced from the location of the point of contact between said object and said spherical member to resist the translational and rotational displacement of said object within said passage.

* * * * *